US006368739B1

(12) United States Patent
Frost et al.

(10) Patent No.: US 6,368,739 B1
(45) Date of Patent: Apr. 9, 2002

(54) JOINED SOLID OXIDE FUEL CELL STACKS AND METHOD FOR FABRICATING SAME

(75) Inventors: Lyman J. Frost, North Canton, OH (US); Singaravelu Elangovan, Sandy, UT (US); Joseph Jay Hartvigsen, Kaysville, UT (US); Mark Timper, Salt Lake City, UT (US); Dennis L. Larsen, West Valley City, UT (US)

(73) Assignee: Sofco, Salt Lake City, UT (US)

( * ) Notice: Subject to any disclaimer, the term of this patent is extended or adjusted under 35 U.S.C. 154(b) by 0 days.

(21) Appl. No.: 09/391,947

(22) Filed: Sep. 8, 1999

(51) Int. Cl.[7] ................................................ H01M 8/10
(52) U.S. Cl. ...................................................... 429/30
(58) Field of Search .............................. 429/21, 30, 33, 429/34, 35

(56) References Cited

U.S. PATENT DOCUMENTS 3,520,731 A * 7/1970 Rightmire et al. ............ 429/32
5,145,754 A * 9/1992 Misawa et al. ................ 429/32
5,238,754 A * 8/1993 Yasuo et al. .................. 429/30
5,270,131 A * 12/1993 Diethelm et al. ............. 429/34
5,688,610 A * 11/1997 Spaeh et al. .................. 429/30
5,856,035 A * 1/1999 Khandkar et al. ............ 429/32
6,110,612 A * 8/2000 Walsh ........................... 429/13
6,110,614 A * 8/2000 Fellows ........................ 429/19

* cited by examiner

Primary Examiner—Gabrielle Brouillette
Assistant Examiner—M. Wills
(74) Attorney, Agent, or Firm—Factor & Partners

(57) ABSTRACT

The invention comprises a solid oxide fuel cell system comprising at least two solid oxide fuel cell stacks and at least one extension member. Each solid oxide fuel cell stack includes a plurality of solid oxide fuel cells. Each cell is separated by an interconnect. The extension member joins at least one interconnect of one of the solid oxide fuel cell stacks with a corresponding interconnect of another of the solid oxide fuel cell stacks. The invention further includes a method of fabrication.

18 Claims, 3 Drawing Sheets

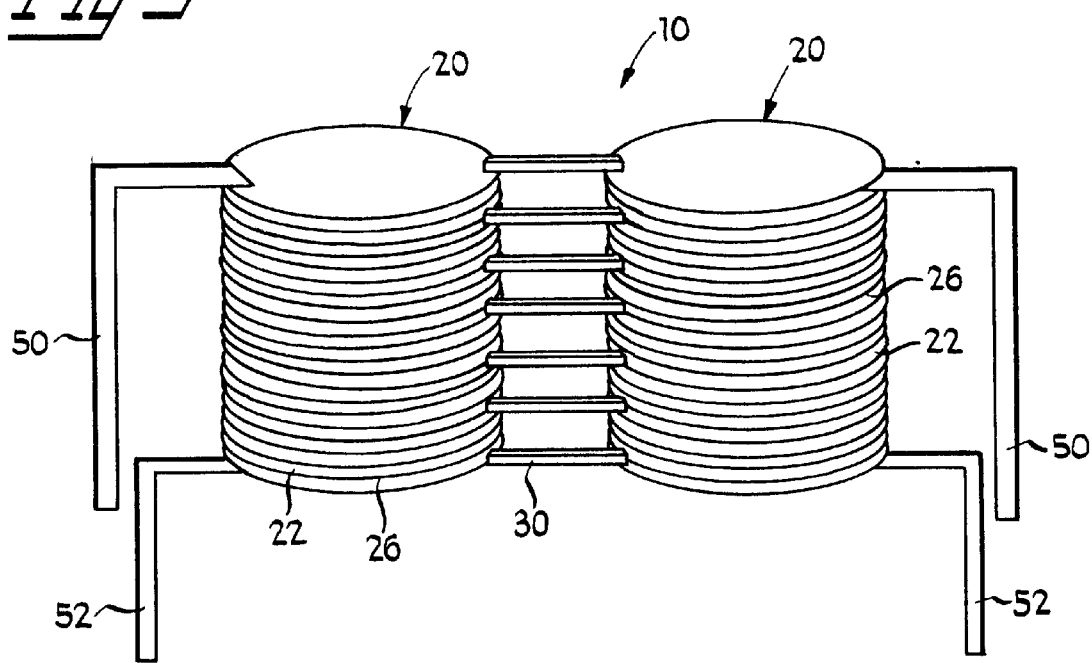
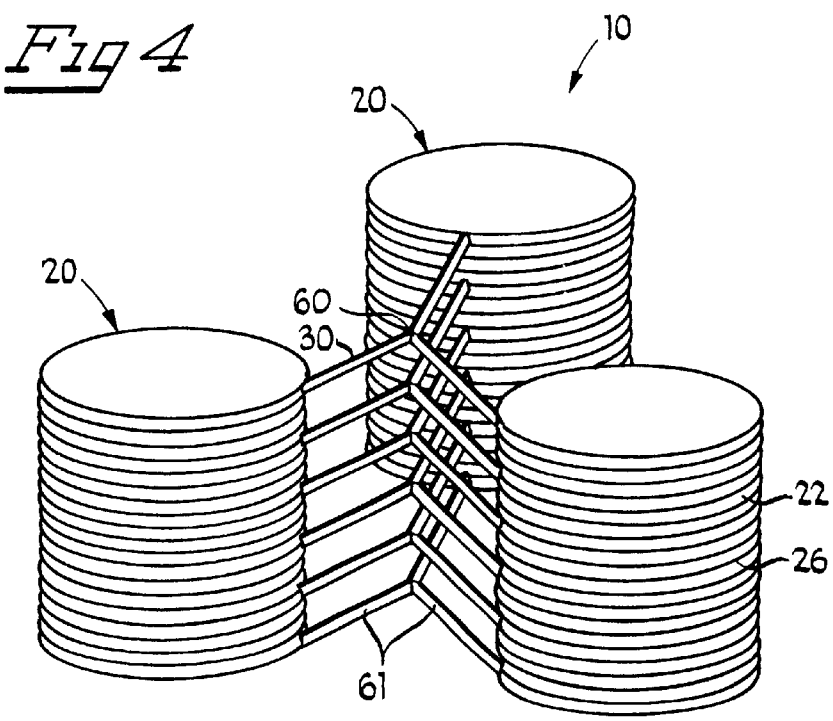

JOINED SOLID OXIDE FUEL CELL STACKS AND METHOD FOR FABRICATING SAME

BACKGROUND OF THE INVENTION

1. Field of the Invention

The present invention is directed to joined solid oxide fuel cell stacks, and more particularly to a solid oxide fuel cell system and method of fabricating same.

2. Background Art

Generally, solid oxide fuel cells are designed for a service life of at least five years with a performance decay of less than 0.5% per 1000 hours of power output. Performance decay in fuel cell stacks has several sources. These sources include changes in electrode microstructure, delamination of electrodes from the electrolyte and cracked ceramic components (where ceramic components are utilized).

Solid oxide fuel cells are generally arranged in stacks of individual solid oxide fuel cells (electrolyte with electrodes) separated by interconnects. Interconnects provide reactant gas conduits and provide electrical series connection of the individual cells. The failure of one cell in a stack drastically affects the performance of the entire stack, which is exacerbated over time. In particular, a failed cell will exhibit higher temperature due to the direct mixing of reactant gasses or due to the higher resistance which is caused by physical or electrochemical changes in electrodes of the cell. Such an increase in temperature in the failed cell likewise detrimentally affects the adjoining cells, increasing cell degradation thereof.

Further, since the temperature is higher in one cell (i.e. the failed cell), a temperature variation or gradient appears across the stacks. Since the temperature of the cell is directly related to resistance, while all of the cells are identical, the cells in the cooler region would show a higher resistance. As a result, the cooler cells will be at a lower operating potential than the cells in the hotter region again affecting total output. Thus, the failure of even a single cell adversely affects the cell stack.

Certain solutions have been proposed to minimize the effect of a failed cell. For example, as disclosed in U.S. Pat. No. 5,238,754, multiple cells are arranged on a single large interconnect to render a cell/interconnect unit. Subsequently, the cell/interconnect units are vertically layered so as to form a stack. The purpose of such a construction is to provide for a large active area by the summation of multiple small area cells on a single interconnect. Further, since the cells of any one unit are essentially connected in parallel, the cells of a single unit provide redundant electrical paths. While this solution has had some success, there are several drawbacks. First, it is difficult to make large area interconnects that can meet the required flatness requirements. In addition, the interior edges of each cell of each unit cannot be inspected for seal effectiveness. In addition, this arrangement does not protect against seal or cell failures which will allow reactant cross-over to affect downstream cells in the frames.

Thus, it would be an object of the invention to improve reliability of the fuel cell stack by providing alternate and/or redundant electrical paths around failed cells.

It would also be an object of the invention to even out the voltage distribution among the cells in the stack.

It would further be an object of the invention to equalize the temperature distribution in the stack.

It would further be an object of the invention to minimize the thermal stresses and sealing problems of the cell due to differences in thermal expansion across the stack.

These and other objects will become apparent in light of the specification and claims.

SUMMARY OF THE INVENTION

The invention comprises a solid oxide fuel cell system. The system comprises at least two solid oxide fuel cell stacks and at least one extension member. Each solid oxide fuel cell stack includes a plurality of solid oxide fuel cells. Each cell is separated by an interconnect. The extension member joins at least one interconnect of one of the solid oxide fuel cell stacks with a corresponding interconnect of another of the solid oxide fuel cell stack.

In a preferred embodiment, the at least one extension member comprises a plurality of extension members. Each extension member joins an interconnect of one solid oxide fuel cell stack with a corresponding interconnect of another of the solid oxide fuel cell stack. In one such preferred embodiment, wherein each stack includes at least five interconnects, an extension member joins every fifth interconnect of one solid oxide fuel cell stack with a corresponding interconnect of another solid oxide fuel cell stack.

In another preferred embodiment, the system includes three solid oxide fuel cell stacks.

In such an embodiment, the extension member joins one interconnect of one solid oxide fuel cell stack to an interconnect of each of the other solid oxide fuel cell stacks. In one embodiment, the extension member includes a hub and at least one spoke extending from the hub to each corresponding interconnect of each solid oxide fuel cell stack.

In another preferred embodiment, the system includes four solid oxide fuel cell stacks. In one such embodiment, the extension member joins an interconnect of one of the fuel cell stacks to the corresponding interconnect of each of the remaining fuel cell stacks. In one such embodiment, the extension member may comprise a hub and a spoke extending from the hub to each corresponding interconnect of each solid oxide fuel cell stack. In another such embodiment, the extension member may individually connect each corresponding interconnect of each fuel cell stack.

In another preferred embodiment, the extension member is configured so as to facilitate access to substantially the entirety of the outer perimeter of the fuel cells of each of the fuel cell stacks.

In yet another embodiment, the system further includes at least one current collector associated with the at least one extension member.

The invention further includes a method of fabricating a solid oxide fuel cell system. The method comprises the steps of providing at least two solid oxide fuel cells stacks and associating at least one interconnect of one solid oxide fuel cell stack to a corresponding interconnect of another of the solid oxide fuel cell stacks by way of the extension member.

In a preferred embodiment, the step of attaching comprises the step of associating at least one interconnect of one solid oxide fuel cell stack to a corresponding interconnect of each of the remaining solid oxide fuel cell stacks by way of an extension member.

In another embodiment, the step of attaching comprises the step of repeating the step of attaching for each of a predetermined plurality of extension members.

In another preferred embodiment, the step of associating a current collector with the extension member.

BRIEF DESCRIPTION OF THE DRAWINGS

FIG. 3 of the drawings is a perspective view of a two circular stack embodiment of the present invention;

FIG. 4 of the drawings is a perspective view of a three circular stack embodiment of the present invention;

DETAILED DESCRIPTION OF THE DRAWINGS

Figure 1:
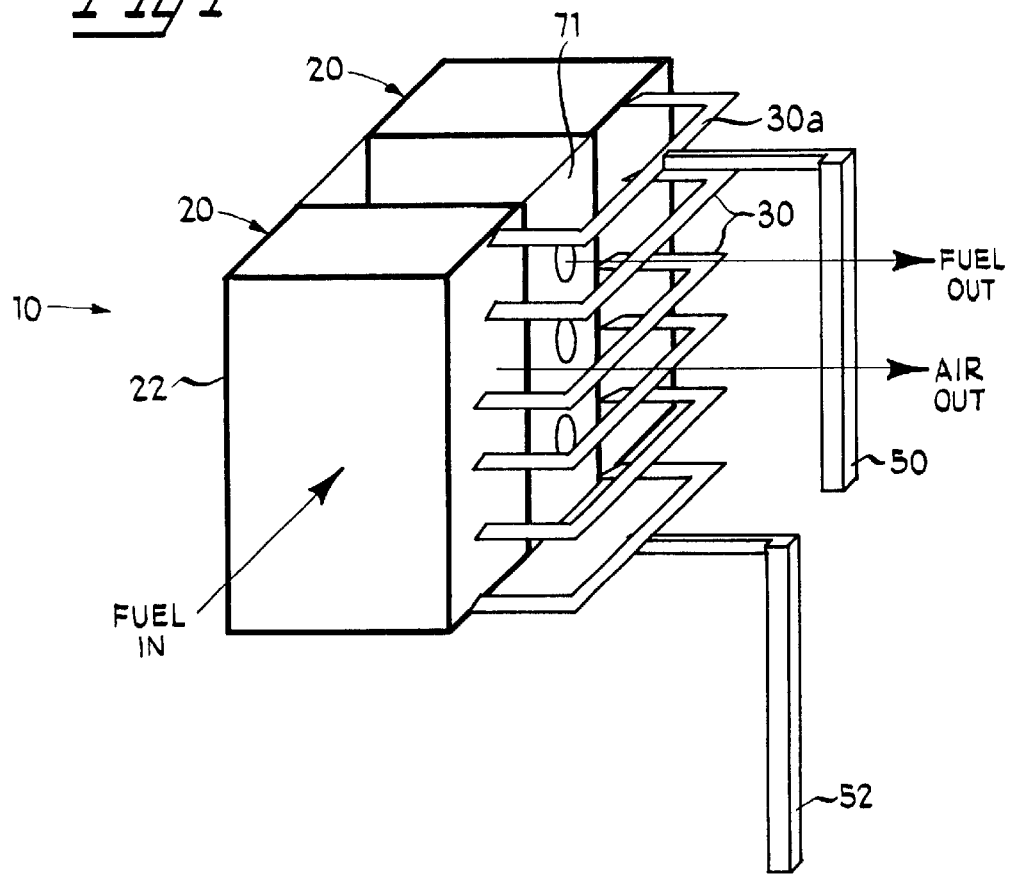
FIG. 1 of the drawings is a perspective view of a two stack embodiment of the present invention.

While this invention is susceptible of embodiment in many different forms, there is shown in the drawings and will herein be described in detail, several specific embodiments, with the understanding that the present disclosure is to be considered as an exemplification of the principles of the invention and is not intended to limit the invention to the embodiments illustrated.

Solid oxide fuel system 10 is shown in FIGS. 1–6 as comprising a plurality of solid oxide fuel cell stacks, such as stack 20, at least one extension member, such as extension member 30 and current collectors 50, 52 (FIGS. 1, 2, 3 and 6). Solid oxide fuel cell stack generally comprises a plurality of fuel cells 22, and a plurality of interconnects 26. Each fuel cell includes an anode, a cathode, and an electrolyte. The interconnects each additionally includes means for facilitating the passage of air therethrough, for facilitating the passage of fuel therethrough and means for sealing the edges of the cells. Adjoining cells are layered with interconnects 26 extending therebetween so as to render stack 20. The particular materials utilized for each of the components of the fuel cell and for the interconnect may comprise any number of structures known in the art. In addition, the methods utilized for producing and firing the stack may comprise a variety of methods known in the art.

Extension member 30 generally comprises a means by which to associate corresponding interconnects of a plurality of solid oxide fuel cell stacks with each other so as to electrically connect the interconnects in parallel. In tun, the parallel association of the interconnects provides redundant electrical passage through the system of stacks. In particular, as shown in FIG. 1, extension member 30a joins the interconnect of the first solid oxide fuel cell stack with the corresponding interconnect of the second solid oxide fuel cell stack. Generally, the extension member comprises the same material as the interconnect, and, the extension member may be integrally formed and cofired with the interconnect. Of course, in other embodiments, the extension member may comprise various other materials which are capable of electrically associating each of the respective desired interconnects of the various solid oxide fuel cell stacks.

The particular quantity of extension members can be varied. An extension member may be utilized to join each interconnect of a first solid oxide fuel cell stack with each interconnect of a second solid oxide fuel stack. In another embodiment (such as that shown in FIG. 3, extension members can be used to join only certain interconnects of a first solid oxide fuel cell stack with corresponding interconnects of a second solid oxide fuel cell. In such an embodiment, for example, every fifth interconnect of a first solid oxide fuel cell can be joined to the corresponding interconnect of a second solid oxide fuel cell.

Figure 2:
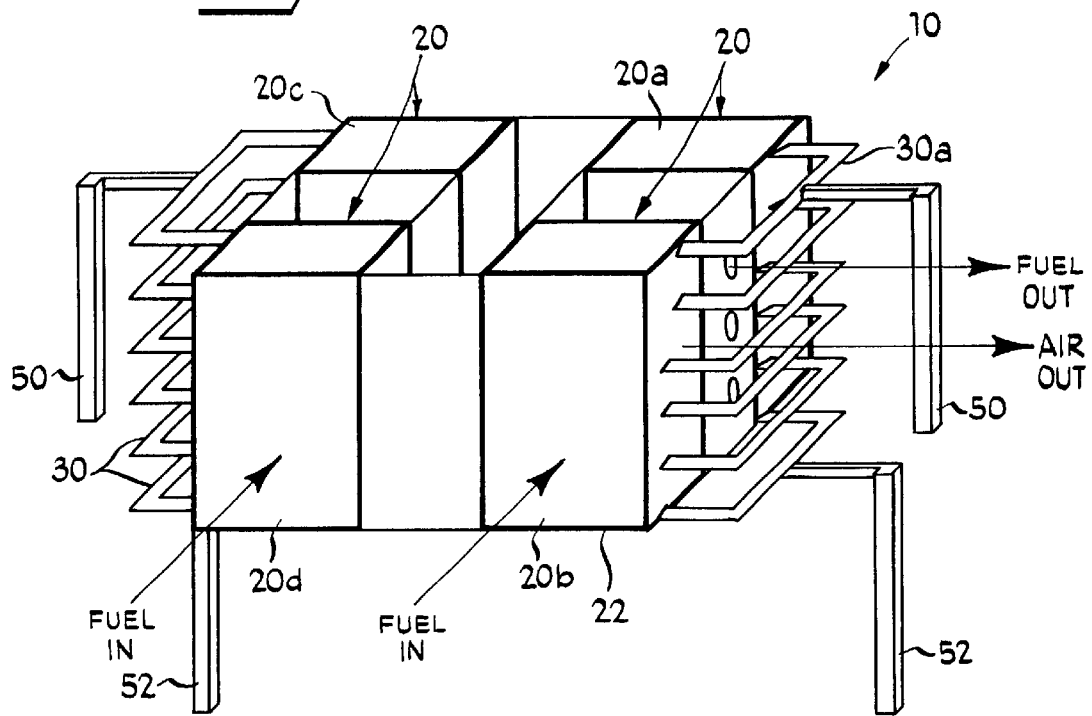
FIG. 2 of the drawings is a perspective view of a four stack embodiment of the present invention.

With reference to FIG. 2, the extension members may join only some of the stacks of cells in solid oxide fuel system 10. For example, extension member 30a of FIG. 2 joins the interconnect of first solid oxide fuel cell stack 20a with the corresponding interconnect of second solid oxide fuel cell stack 20b. Extension member is not associated with either of the third and fourth solid oxide fuel cell stacks 20c, 20d, respectively.

Figure 5:
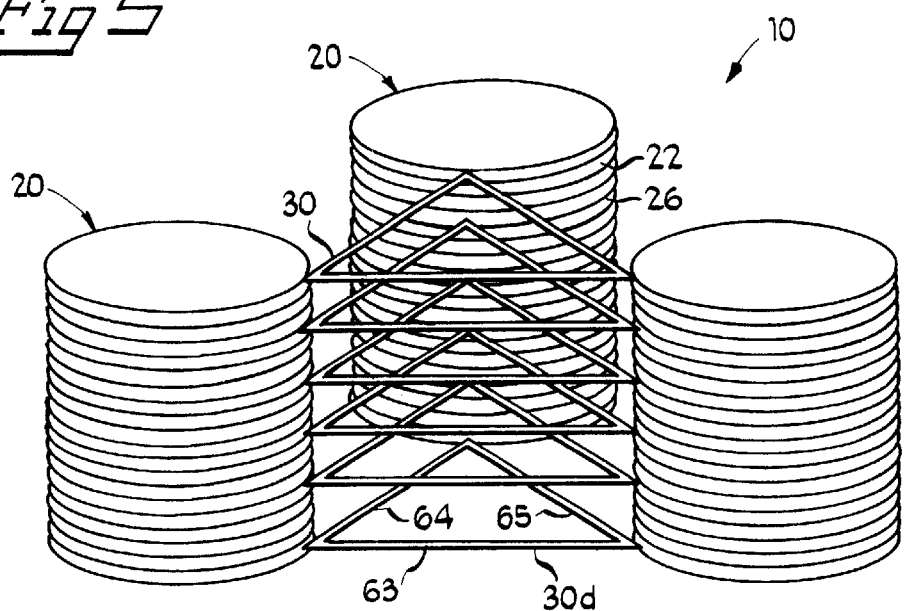
FIG. 5 of the drawings is a perspective view of an alternate three circular stack embodiment of the present invention.
Figure 6:
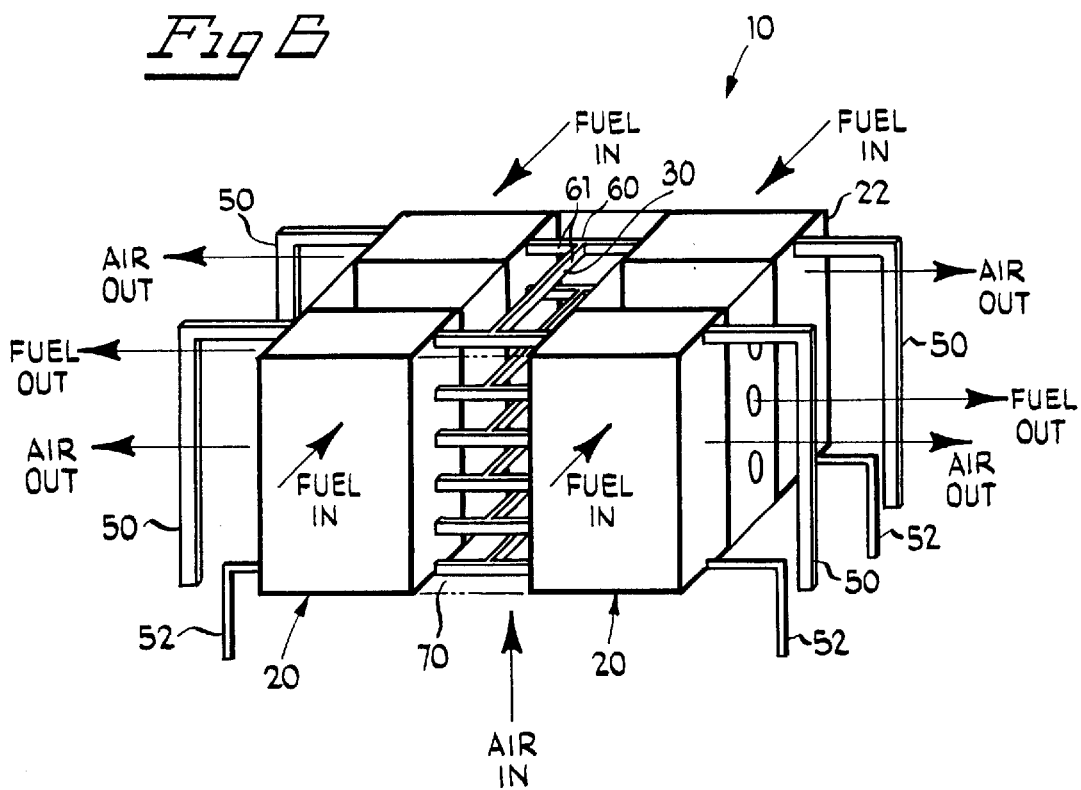
FIG. 6 of the drawings is a perspective view of an alternate four stack embodiment of the present invention.

With reference to FIGS. 4, 5 and 6, the extension member may likewise join an interconnect of a first fuel cell stack with the corresponding interconnect of each of the other fuel cell stacks. In particular, with respect to FIGS. 4 and 6, extension member includes hub 60 and spokes 61 which extend from hub 60 to each of the solid oxide fuel cell stacks of solid oxide fuel cell system 10. In the embodiment of FIG. 5, extension member 30d includes links 63, 64 and 65 which serves to individually associate each corresponding interconnect of each solid oxide fuel cell stack with each other.

In each of the embodiments, it is contemplated that extension member is sized, such that it is sufficient to provide for parallel electrical connection between the interconnects, while facilitating access to the entirety of each solid oxide fuel cell and sealing means extending around such cells. As a result, substantially the entire perimeter of the cell can be inspected for seal effectiveness. In addition, the extension members may be positioned in virtually any region surrounding the cells. For example, the extension members may be positioned proximate air inlet face 70 (FIG. 6) and air outlet face 71 (FIG. 1).

The operation of the system will be explained with respect to FIG. 1 (an embodiment with two solid oxide fuel cells), with the understanding that the operation of the remaining embodiments are substantially similar. In particular, as the cells are activated, current is generated by each of the stacks, and the current is permitted to pass between the cells by way of extension member 30. Wherein the stacks each include substantially identical cells, the operation of the stack will be substantially uniform. Wherein one of the cells of any one of the stacks degrades or fails, and, correspondingly, the output of the cell declines, electric current will automatically transfer through a proximate extension member to another one of the joined stacks so as to detour around the affected cell by way of the extension member and the joined stack.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. A solid oxide fuel cell system comprising:
   at least two solid oxide fuel cell stacks, each stack including a plurality of solid oxide fuel cells, wherein each adjoining solid oxide fuel cell separated by an interconnect; and
   at least one extension member joining at least one interconnect of one of the at least two solid oxide fuel cell stacks with a corresponding at least one interconnect of another of the at least two solid oxide fuel cell stacks, such that at least one of the plurality of solid oxide fuel cells in one of the at least two solid oxide fuel cell stacks is connected in parallel electrically with at least one of the plurality of solid oxide fuel cells of another of the at least two solid oxide fuel cell stacks.

2. The solid oxide fuel cell system of claim 1 wherein the at least one extension member comprises at least two extension members and each of the at least two extension members joining an interconnect of one of the at least two solid oxide fuel cell stacks with a corresponding interconnect of another of the at least two solid oxide fuel cell stacks.

3. The solid oxide fuel cell system of claim 1 wherein the at least one extension member comprises at least two extension members, and wherein each stack includes at least five interconnects, one of the at least two extension members joining every fifth of interconnect of one of the at least two solid oxide fuel cell stacks with a corresponding interconnect of the other of the at least two solid oxide fuel cell stacks.

4. The solid oxide fuel cell system of claim 1 wherein the at least two solid oxide fuel cell stacks comprises three fuel cell stacks.

5. The solid oxide fuel cell system of claim 4 wherein the at least one extension member joins at least one interconnect of one of the three fuel cell stacks to a corresponding interconnect of each of the remaining fuel cell stacks.

6. The solid oxide fuel cell system of claim 5 wherein the at least one extension member includes a hub and at least one spoke extending from the hub to each corresponding interconnect of each solid oxide fuel cell stack.

7. The solid oxide fuel cell system of claim 1 wherein the at least two solid oxide fuel cell stacks comprise four fuel cell stacks.

8. The solid oxide fuel cell system of claim 7 wherein the at least one extension member joins at least one interconnect of one of the four fuel cell stacks to a corresponding interconnect of at least one of the remaining fuel cell stacks.

9. The solid oxide fuel cell system of claim 7 wherein the at least one extension member joins at least one interconnect of one of the four fuel cell stacks to a corresponding interconnect of each of the remaining fuel cell stacks.

10. The solid oxide fuel cell system of claim 9 wherein the at least one extension member includes a hub and at least one spoke extending from the hub to each corresponding interconnect of each of the four fuel cell stacks.

11. The solid oxide fuel cell system of claim 7 wherein the at least one extension member joins each corresponding interconnect of each of the four fuel cell stacks separately to every corresponding interconnect of each of the four fuel cell stacks.

12. The solid oxide fuel cell system of claim 1 wherein the at least one extension member is configured so as to facilitate access to substantially the entirety of the outer perimeter of the fuel cells of each of the at least two stacks of fuel cells.

13. The solid oxide fuel cell system of claim 1 further including at least one current collector associated with the at least one extension member.

14. A method of fabricating a solid oxide fuel cell system comprising the steps of:
providing at least two solid oxide fuel cells stacks, the stacks including a plurality of solid oxide fuel cells each separated by an interconnect; and
associating at least one interconnect of one of the at least two solid oxide fuel cell stacks to a corresponding interconnect of at least one of the remaining at least two solid oxide fuel cell stacks by way of an extension member.

15. The method according to claim 14 wherein the step of attaching comprises the step of associating at least one interconnect of one of the at least two solid oxide fuel cell stacks to a corresponding interconnect of each of the remaining at least two solid oxide fuel cell stacks by way of an extension member.

16. The method according to claim 14 wherein the step of attaching comprises the step of repeating the step of attaching for each of a predetermined plurality of extension members.

17. The method according to claim 14 further comprising the step of associating a current collector with the extension member.

18. A solid oxide fuel cell system comprising:
at least three solid oxide fuel cell stacks, each stack including a plurality of solid oxide fuel cells, wherein each adjoining solid oxide fuel cell is separated by an interconnect; and
at least one extension member connecting at least one interconnect of one of the at least three solid oxide fuel cell stacks with a corresponding interconnect of each of the remaining fuel cell stacks.

* * * * *